United States Patent
Burghouts

(10) Patent No.: US 9,613,276 B2
(45) Date of Patent: Apr. 4, 2017

(54) DETECTION OF HUMAN ACTIONS FROM VIDEO DATA

(71) Applicant: Nederlandse Organisatie voor toegepast-natuurwetenschappelijk onderzoek TNO, 's-Gravenhage (NL)

(72) Inventor: Gerardus Johannes Burghouts, 's-Gravenhage (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 14/439,637

(22) PCT Filed: Oct. 31, 2013

(86) PCT No.: PCT/NL2013/050780
§ 371 (c)(1),
(2) Date: Apr. 29, 2015

(87) PCT Pub. No.: WO2014/070013
PCT Pub. Date: May 8, 2014

(65) Prior Publication Data
US 2015/0286874 A1    Oct. 8, 2015

(30) Foreign Application Priority Data
Oct. 31, 2012   (EP) ..................................... 12190869

(51) Int. Cl.
*G06K 9/00*    (2006.01)
*G06K 9/46*    (2006.01)
(Continued)

(52) U.S. Cl.
CPC ........ *G06K 9/00711* (2013.01); *G06K 9/4676* (2013.01); *G06K 9/52* (2013.01);
(Continued)

(58) Field of Classification Search
CPC ........... G06K 9/00711; G06K 9/00718; G06K 9/00724; G06K 9/00731; G06K 9/00744;
(Continued)

(56) References Cited

U.S. PATENT DOCUMENTS

2012/0008836 A1*  1/2012  Bobbitt .............. G06K 9/00771
                                                      382/113
2013/0132311 A1*  5/2013  Liu ...................... G06N 99/005
                                                      706/12

(Continued)

OTHER PUBLICATIONS

Marszalek et al., "Learning realistic human actions from movies", Jun. 8, 2008, IEEE, Conf. on Computer Vision and Pattern Recogntion 2008, p. 1-8.*

(Continued)

*Primary Examiner* — Chan Park
*Assistant Examiner* — Timothy Choi
(74) *Attorney, Agent, or Firm* — Knobbe, Martens Olson & Bear, LLP

(57) ABSTRACT

A video action detection system uses feature a data extractor to extract feature data from video data at detected spatiotemporal interest points. A feature data quantizer assigns the extracted feature values to bins of a feature vector. Bin values are computed from a sum of contributions of spatiotemporal points of interest that have been assigned to the bin, with a bin dependent adjustment of a size of the sum and/or the contributions. The video action detection system computes a sum of match scores between the feature vector and reference vectors for the predetermined type of action. The bin dependent adjustment of the size of the sum and/or (Continued)

the contributions is adapted in a training step, based on partial match scores for individual bins obtained using an initial action detector.

14 Claims, 4 Drawing Sheets

(51) Int. Cl.
  *G06K 9/62* (2006.01)
  *G06K 9/52* (2006.01)
  *G06T 7/20* (2017.01)
  *G06T 5/00* (2006.01)

(52) U.S. Cl.
  CPC .............. *G06K 9/6212* (2013.01); *G06T 7/20* (2013.01); *G06T 5/00* (2013.01); *G06T 5/001* (2013.01); *G06T 5/002* (2013.01)

(58) Field of Classification Search
  CPC ........... G06K 9/00765; G06K 9/00771; G06K 9/4976; G06K 9/6212; G06K 9/6217; G06K 9/6218; G06K 9/622; G06K 2009/00738; G06T 7/2033
  See application file for complete search history.

(56) References Cited

U.S. PATENT DOCUMENTS

| | | | | |
|---|---|---|---|---|
| 2014/0105573 | A1* | 4/2014 | Hanckmann | G06K 9/00718 386/241 |
| 2015/0356376 | A1* | 12/2015 | Burghouts | G06K 9/6255 382/159 |

OTHER PUBLICATIONS

Jurie, F. and Triggs, B, "Creating Efficient Codebooks for Visual Recognition," Computer Vision, 2005, ICCV 2005, Tenth IEEE International Conference , vol. 1, Oct. 17, 2005, pp. 604-610.
Brank, J. et al., "Feature Selection Using Linear Support Vector Machines," Technical Report MSR-TR-2002-63, Microsoft Research, Jun. 12, 2002.
Wang, J. et al., "Action Recognition with Multiscale Spatio-Temporal Contexts", Computer Vision and Pattern Recognition (CVPR), 2011 IEEE Conference on, IEEE, Jun. 20, 2011, pp. 3185-3192.
Vedaldi, A. et al., "Multiple Kernels for Object Detection," Computer Vision, 2009 IEEE 12th International Conference on, IEEE, Sep. 29, 2009, pp. 606-613.
Vedaldi, A. et al., "Efficient Additive Kernels via Explicit Feature Maps," IEEE Transactions on Pattern Analysis and Machine Intelligence, vol. 34, No. 3, Mar. 2012.
Subhransu, M. et al., "Max-margin additive classifiers for detection", Computer Vision, 2009 IEEE 12th International Conference on, IEEE, Sep. 29, 2009, pp. 40-47.
Jhuang, H. et al., "A Biologically Inspired System for Action Recognition," Computer Vision, 2007, ICCV 2007, IEEE 11th International Conference O N, Oct. 1, 2007, pp. 1-8.
Mutch, J. et al., "Multiclass Object Recognition with Sparse, Localized Features," Conference on Computer Vision and Pattern Recognition, 2006 IEEE Computer Society, vol. 1, Jun. 17, 2006, pp. 11-18.
International Search Report and Written Opinion dated Feb. 25, 2014 for PCT/NL2013/050780.
H. Wang, M. M. Ullah, A. Klaser, I. Laptev, C. Schmid, "Evaluation of local spatio-temporal features for action recognition," British Machine Vision Conference, 2009.
G.J. Burghouts, K. Schutte, "Correlations between 48 human actions improve their detection," ICPR, 2012.
J. Sivic, A. Zisserman, "Video Google: A Text Retrieval Approach to Object Matching in Videos," International Conference on Computer Vision, 2003.
I. Laptev, "On Space-Time Interest Points," International Journal of Computer Vision, 2005.
G.J. Burghouts, K. Schutte, H. Bouma, R.J.M. den Hollander, "Selection of Negative Samples and Two-Stage Combination of Multiple Features for Action Detection in Thousands of Videos," Machine Vision and Applications, special issue on multimedia event detection, submitted, 2012.
F. Moosmann, B. Triggs, F. Jurie, "Fast Discriminative Visual Codebooks using Randomized Clustering Forests,"0 Neural Information Processing Systems, 2006.
J. Zhang, M. Marszalek, S. Lazebnik, C. Schmid, "Local features and kernels for classification of texture and object categories: A comprehensive study," International Journal of Computer Vision, 2007.
J.R.R. Uijlings, A.W.M. Smeulders, R.J.H. Scha, "The Visual Extent of an Object—Suppose We Know the Object Locations," International Conference on Computer Vision, 2012.
L. Itti, C. Koch, E. Niebur, "A model of saliency-based visual attention for rapid scene analysis," IEEE Transactions on Pattern Analysis and Machine Intelligence, 1998.
D. Gao and N. Vasconcelos, "Discriminant saliency for visual recognition form cluttered scenes," Neural Information Processing Systems, 2004.
T. Harada, Y. Ushiku, Y. Yamashita, Y. Kuniyoshi, "Discriminative spatial pyramid," International Conference on Computer Vision and Pattern Recognition, 2011.
B. Yao, A. Khosla, L. Fei-Fei, "Combining randomization and discrimination for fine-grained image categorization," International Conference on Computer Vision and Pattern Recognition, 2011.
G. Sharma, F. Jurie, C. Schmid, "Discriminative Spatial Saliency for Image Classification," International Conference on Computer Vision and Pattern Recognition, 2012.
J. Liu, J. Luo, M. Shah, "Recognizing Realistic Actions from Videos 'in the Wild'," International Conference on Computer Vision and Pattern Recognition, 2009.
B. Chakraborty, M. Holte, T.B. Moeslund, J. Gonzalez, "Selective Spatio-Temporal Interest Points," Computer Vision and Image Understanding, 2012.

\* cited by examiner

DETECTION OF HUMAN ACTIONS FROM VIDEO DATA

CROSS REFERENCE TO RELATED APPLICATIONS

This application is the U.S. National Phase of International Application No. PCT/NL2013/050780, filed Oct. 31, 2013, designating the U.S. and published in English as WO 2014/070013 A1 on May 8, 2014 which claims the benefit of European Patent Application No. 12190869.3, filed Oct. 31, 2012. Any and all applications for which a foreign or domestic priority claim is identified in the Application Data Sheet as filed with the present application are hereby incorporated by reference under 37 CFR 1.57.

FIELD OF THE INVENTION

The invention relates to a video image processing system and method, and in particular to automated adaptive detection of action types of actions shown in video segments.

BACKGROUND

It is known to use video input to detect action types of actions. Action type detection may be used in video surveillance system and for retrieving video segments from stored video data using search queries. Video search queries may be expressed in terms of action type, for example to search for a video fragment where somebody exchanges an item with another person. To facilitate a wide range of applications, detection of dozens of different types of action is desirable. State-of the-art detection of human actions from such videos is not very reliable yet.

Action detectors based on the bag-of-features model (hereafter referred to as bag-of-features action detectors) have demonstrated to be also very effective for the task of action detection. Bag-of-features action detectors are constructed by combining some spatiotemporal feature detections, a codebook or quantizer to transform the features detections into histograms as a means to represent a (part of a) video as a feature vector, and a classifier to detect the action. An example of a bag of feature process for detecting the presence of a predetermined type of action in video data comprises detecting spatiotemporal points of interest in the video data; extracting a feature descriptor from the video data in spatiotemporal areas at the detected spatiotemporal points of interest; assigning the detected spatiotemporal points of interest to bins in a feature vector, also called bag-of-feature histogram, based on the extracted feature data; computing bin counts of the feature histogram for each respective bin, of spatiotemporal points of interest that have been assigned to the bin; computing match scores between the feature histogram and each of a plurality of reference histograms for the predetermined type of action, and summing products of the match scores with factors for the reference histograms. The method may be applied to a plurality of predetermined types of action respectively, using different sets of reference histograms for the respective different predetermined types of action. The match score may be a sum over the bins of the smallest of the bin value of the feature histogram for the bin and the bin value the reference histogram for the bin. However, other known measures for histogram intersection may be used. A detection score may be computed from the result of summing the products by applying a predetermined detection function to a sum of the result and a bias value. A yes/no detection may be obtained by comparing the result of summing the products with a threshold.

Bag-of-features action detectors are attractive because the prior art provides for an automatic training process to determine the reference histograms by means of using bin values obtained from training video segments. Typically this involves use of training video segments with associated designation codes that indicate the type (or types) of action that is shown in the video segment. From these video segments a positive and negative training set for a predetermined type of action can be derived, with video segments associated with the associated designation code of the predetermined type of action and not associated with that designation code respectively. The training process is used to make a selection of reference histograms that maximizes the correlation between detection results with membership of the positive and negative training sets. Usually training process is also used to select a bias value, factors for the reference histograms, as well as parameters for the assignment of the detected spatiotemporal points of interest to bins of the feature histogram.

The advantage such bag-of-features action detectors is simplicity, straightforward implementation, and computational efficiency. Such bag-of-features detectors have proven to be effective for a range of actions including quite complex action such as digging in the ground, falling onto the ground, and chasing somebody.

Yet, for the detection of more complex actions, such as the exchange of an item, or burying or hauling something, the standard bag-of features action detectors did not suffice. One of the reasons that the detection of exchange, bury or haul is hard, is that these actions involve detailed motion patterns and their duration is short. The large part of the total set of features is triggered by irrelevant actions that precede or follow the detailed action (e.g. walking) or by background clutter (e.g. a person moving in the background). The relevant subset of features is likely to be a small fraction of the total set.

Code book creation for visual recognition is described in an article by Jurie et al. published in the $10^{th}$ international conference on computer vision 2005 in Beijing (ICCV 2005) on pages Vol 1 pages 604-610 (EPO reference XP010854841). Jurie et al use a codebook algorithm that selects patches from an image (e.g. 11×11 pixel gray level patches), computes a descriptor value from the image content in the patch, and quantizes the descriptor value. Quantization is based on clustering, that is, the selection of descriptor values that form the centers of clusters of descriptor values obtained from patches in training images. Thus, clustering produces many clusters in the region of descriptor values where maximum density of descriptor values occurs. In addition, Jurie et all propose to obtain centers of clusters lower density regions by repeating clustering after elimination patches in the maximum density region.

Jurie et al note that in this case the codebook will become larger than the number of useful features, so that subsequent feature selection becomes necessary. Jurie names mutual information, odds ratio and linear SVM weights as several feature selection methods, but discloses no detail. Feature selection using linear support vector machines is disclosed by Brank et al in a Microsoft research technical report (MSR-TR-2002-63) titled "Feature selection using linear support vector machines" (EPO reference XP055055892. Brank et all consider the problem that the training set is too large for use to perform complete SVM training. Instead Brank et al. proposes initial SVM training using a reduced training set, followed by the elimination of features based on feature scoring, and SVM retraining using only retained features.

Brank et al disclose information gain, odds ratio and linear SVM weights as feature scoring methods for the elimination. Information gain expresses the entropy increase resulting from elimination of a feature. Odds ratio uses the ratio between the probabilities of the feature in positive and negative training examples. Use of linear SVM weights considers the case that SVM detection is based by comparing a linear SVM kernel value with a threshold. The linear SVM kernel is a sum of products of feature counts with weight values. In this case, features are retained based on the size of the corresponding weight in the linear SVM kernel.

Wang et all discloses action recognition using spatio-temporal interest points in an article titled "Action recognition with multi-scale spatio-temporal contexts", published in The 2011 IEEE conference on computer vision and pattern recognition pages 3185-3192 (EPO reference XP032037995). Wang et al propose to capture contextual information about each interest point based on the density of features near the interest point. Training is used to select an SVM kernel that uses this density.

SUMMARY

Among others, it is an object to improve the reliability of action detection from video data.

A method according to claim 1 is provided. Herein bin values are computed from a sum of contributions associated with spatiotemporal interest points (STIPs) that have been assigned to the bin, with the added feature of a bin dependent adjustment of a size of the sum and/or the contributions of at least one of the bins dependent on the predetermined type of action. In an embodiment, the bin dependent adjustment comprises multiplying the sum and/or the contributions of at least one of the bins by a weighing factor that depends on the at least one of the bins and the predetermined type of action. The weighting factors for respective bins may be selected dependent on the feature vector, feature vectors from the training set and the SVM coefficients. Thus, the weighting factors may be specific to the test feature vector.

However, other ways of adjustment may be used: for example non-linear functions of the sum may be used (e.g. exponents of the sum) that increase more rapidly as a function of the sum for some bins than for others. When the method is applied to a plurality of predetermined types of action, using different sets of reference histograms, detection of each type of action may involve its own independent bin dependent adjustment.

Thus a bag-of-features action detector is extended with what will be called a saliency map, which emphasizes certain bins relative to others for the detection of specific types of action. Its purpose is to improve the selectivity of the feature representation by weighting each feature by its relevance for the action of interest. In an embodiment the saliency map depends on the current video as well as the current action of interest. In an embodiment a simple weighting scheme is provided that is easy to implement, computationally efficient, and deployable for the retrieval/detection of a wide range of actions. We demonstrate that in a bag-of-features setup, the retrieval accuracy can be drastically improved by the proposed saliency map.

In the embodiment with a weighing factor that depends on the at least one of the bins, the weighting factor for the bin may be selected dependent on a count value of STIPs in the bin. The selection may be based on a plurality of support vectors for the predetermined type of action, the weighting factor being increased with increasing count value when at least one of the support vectors for the predetermined type of action defines a component value for the bin that is higher than the count value of STIPs in the bin. In this way classification accuracy can be improved when there are multiple clusters of feature vectors within a class.

The bin dependent adjustment may be controlled by a bin dependent parameter such as the weighing factor. In an embodiment, an automated method of selecting such a parameter based on training video segments is provided, the method comprising determining a set of reference vectors, which may have coefficients of relative contribution, by means of an automatic training process using training bin values obtained without said adjustment, for example using an SVM training process, which is known per se;

computing bin scores for individual bins from scores for matches between bin values of bins of the further set of reference vectors and counts of spatiotemporal points of interest from a set of video segments that have been designated to show the predetermined type of action;

determining the value of the parameter based on the bin scores for the individual bins, the parameter being set to increase or decrease the bin value of the at least one of the bins relative to the bin values of other ones of the bins according to whether the bin score for the at least one of the bins is larger or smaller than the bin score for the other ones of the bins respectively;

determining the reference vectors by means of an automatic training process, for example using an SVM training process, which is known per se for the second time, using bin values obtained with said adjustment controlled by the parameter value.

This automated selection method makes it possible to improve video detection reliability. In an embodiment the bin score used in the training process is a sum of the fraction of a bias value and the further match score for the bin. This embodiment comprises determining the bias value for the predetermined type of action as a whole by means of said automatic training process using training bin values obtained without said adjustment, and assigning fractions of the bias value to respective ones of the bins, dependent on said counts for the respective one of bins, the bin score for each for individual bin being a sum of the fraction of the bias value assigned to the bin and the further match score for the bin. The fractions of the bias value may be assigned in proportion to an average of said counts for the respective one of bins for a training set for example. It has been found that this improves detection reliability for some types of action.

In an embodiment a choice is made between different ways of determining the fractions. For example, a choice may be made between equal distribution and count dependent distribution. Thus different distributions can be selected for different types of action, which increases reliability.

The method may be executed by programmable computer system, such as a single computer for both detection and training, or a combination of computers. This computer system may be provided with a computer program product with a program of computer executable instructions, for example a magnetic or optical disk or a semi-conductor memory. A program may be provided that, when executed by the programmable computer system, will cause the programmable computer system to execute the method according to any one of the preceding claims In an embodiment a video action detection system according to claim 12 is provided.

BRIEF DESCRIPTION OF THE DRAWING

These and other objects and advantageous aspects will become apparent from a description of exemplary embodiments, using the following figures

DETAILED DESCRIPTION OF EXEMPLARY EMBODIMENTS

Figure 1:
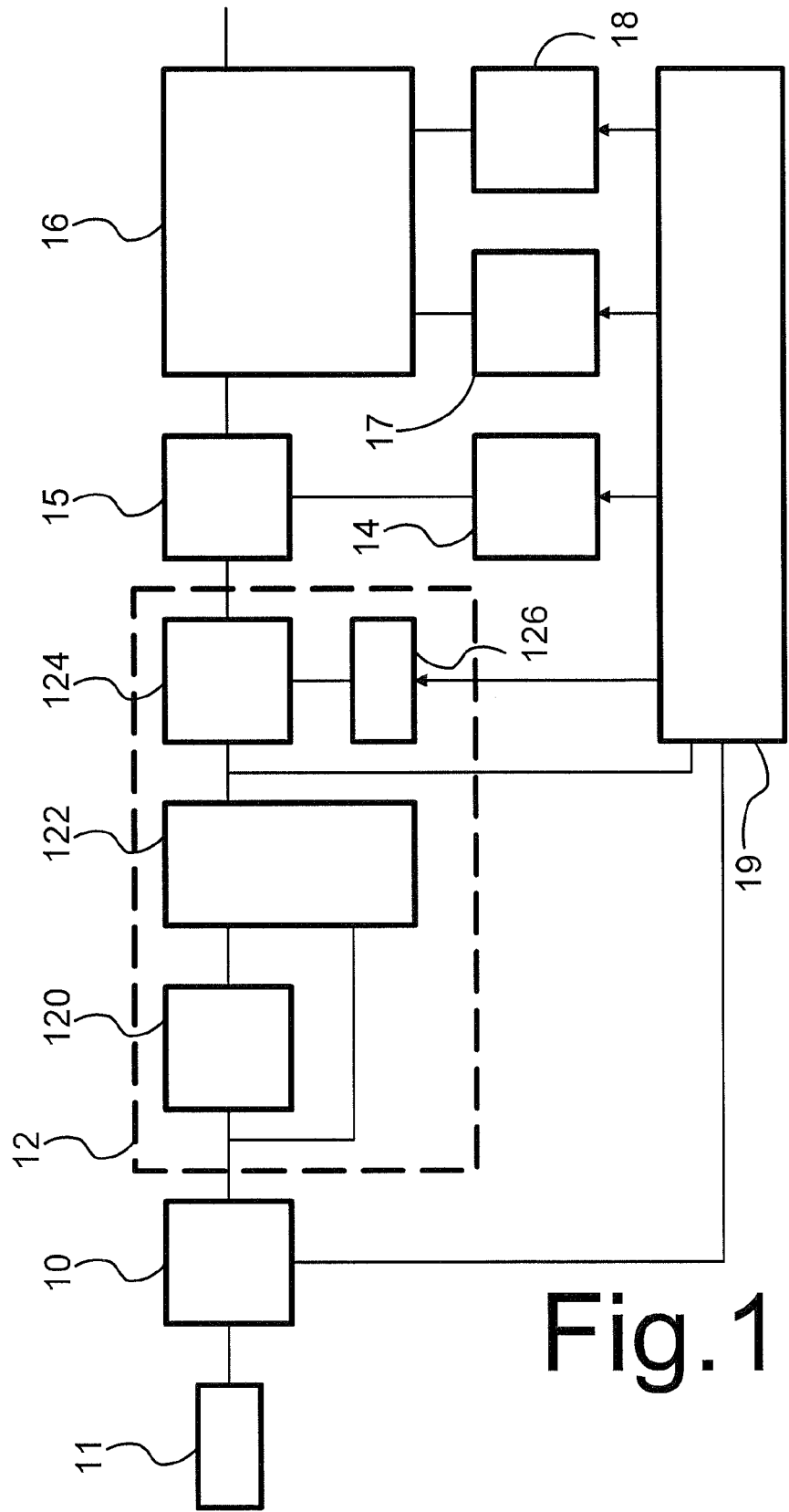
FIG. 1 shows an action type detection system

FIG. 1 shows a video processing system for detecting action types, the system comprising an input video data memory 10, a feature processor 12 with an input coupled to input video data memory 10, a weight memory 14, a multiplier 15 with inputs coupled to outputs of feature processor 12 and weight memory 14, a detector 16 with an input coupled to an output of multiplier 15, a control computer 19, a support vector memory 17 with an output coupled to detector 16, a detection parameter memory 18 with an output coupled to detector 16. A camera 11 is shown coupled to input video data memory 10. Feature processor 12 comprises a feature detector 120 with an input coupled to input video data memory 10, a feature value extractor 122 with inputs coupled to feature detector 120 and input video data memory 10, a histogram binning (sometimes also called quantization) unit 124 with an input coupled to histogram binning unit 124 and a binning parameter memory 126 coupled to histogram binning unit 124. Control computer 19 has outputs coupled to binning parameter memory 126, weight memory 14, support vector memory 17, and detection parameter memory 18. Control computer 19 has an input coupled to the output of feature value extractor 122. Although the components of the system are shown as distinct elements, it should be understood that various components my in fact be integrated with each other, and/or implemented using a programmable computer and programs for that computer.

Figure 2:
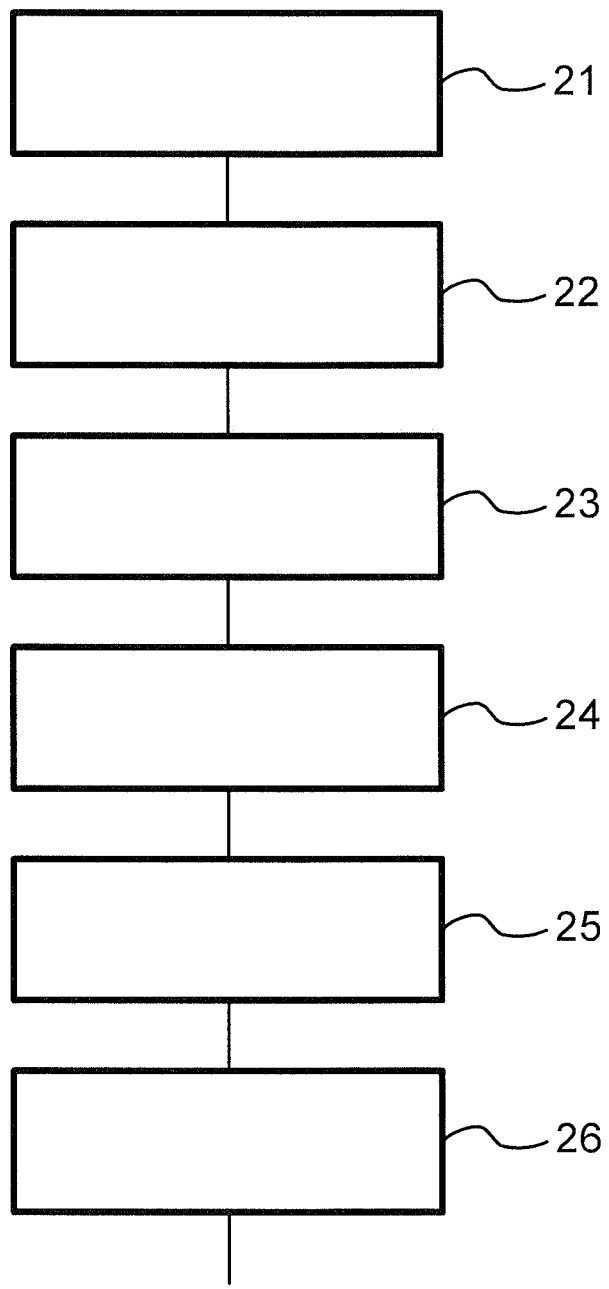
FIG. 2 shows a flow chart of video processing

FIG. 2 shows a flow chart of video processing by the video processing system of FIG. 1. In a first step 21, feature detector 120 detects the spatiotemporal points (corresponding to a combination of x, y and t coordinates) in a video sequence where of predetermined types of feature occur. As is known per se, a video sequence corresponds to a series of images for successive time points, which may be coded in any format, such as bit maps, MPEG etc. Feature detector 120 may be configured to detect any of various types of feature, for example features where spatiotemporal edges (transitions between distinct image content) along different spatiotemporal directions converge. The detected spatiotemporal points are referred to as (spatiotemporal) interest points, or more briefly as STIPs.

In a second step 22, feature value extractor 122 extracts parameter values from the video sequence from spatiotemporal image areas in the video sequence in predetermined spatiotemporal relation to the detected spatiotemporal points. Collectively, the extracted parameter values are referred to as a (extracted) description vector, the individual extracted parameter values being called description vectors. In one example the description vector may comprise one or more histograms of pixel values, or spatial and/or temporal gradients of the pixel values in the image areas. That is, the extracted parameter values (description vectors) may be counts of occurrences of pixel values, or spatial and/or temporal gradients of the pixel values in the image areas. A plurality of different histograms may be computed for each detected STIP, so that the counts from the different histograms together form the description vector.

In a third step 23, histogram binning unit 124 assigns each STIP to a bin of a feature vector (also called feature histogram), dependent on the extracted parameter values and counts the numbers of features assigned to the different bins. The term "bin" will be used to refer to the elements (components) of the feature vector to emphasize that the value of the element has been produced by counting (summing). Note that the feature histogram is distinct from the histograms that may provide the description vectors: the latter histograms typically contain counts of pixels with a certain pixel value (gradient), whereas the feature histograms contain counts of features, i.e. counts of detected STIPs with description vectors within a vector range corresponding to a feature bin. Basically, description vector binning is a form of quantization. In an embodiment a codebook may be used with reference description vectors for the respective bins, combined with a distance measure between description vectors, the STIP being assigned to the bin that has the reference description vector with smallest distance measure to the extracted description vector. In another embodiment a decision tree may be used to assign the STIP to a bin, the decision tree having nodes corresponding to decision criteria in terms of the extracted feature parameters, and leaf nodes corresponding to bins, each node, except for the leaf nodes, defining successor nodes to be visited dependent on the result of the application of its decision criterion. In an example of this is the random forest approach which is known per se. The resulting counts pi are normalized so that they sum to one.

In a fourth step 24, multiplier 15 multiplies the counts pi in the individual bins (labeled by i) with bin-specific weight factors "w" (also called wi to indicate bin dependence), obtained by means of weight memory 14. The factors "w" which may be different for different bins: they may be a function of the bin i and/or of the count pi in the bin.

In a fifth step 25, detector 16 computes a detection score from a histogram with the multiplied counts. In this computation, detector 16 computes comparison values for the histogram with the multiplied counts on one hand and reference histograms (also called support vectors "zji") from support vector memory 17 on the other hand (j being a label that distinguishes different support vectors and i being a label of a feature bin). As may be noted, this corresponds to support vector machine (SVM) match score computation, which is known per se. In an embodiment, the comparison value is determined by summing terms for respective bins, the term for a respective bin being the minimum (smallest value) of the multiplied count wxpi for the bin i and the value zji from the support vector in the bin i. In an embodiment, detector 16 computes a sum of a bias value "b" and a weighted sum of the comparison values, using a bias value b and support vector multipliers alpha(j) for the different support vectors zji obtained using detection parameter memory 18.

In a sixth step 26, detector 16 determines a decision whether an action from a class corresponding to the support vectors has been detected, dependent on whether the sum of the bias and the sum of the products with the support vector multipliers is greater than zero. As may be noted, this corresponds to support vector machine (SVM) detection, which is known per se. In an embodiment, sixth step 26 may be omitted, the sum being used as detector output.

The process of FIG. 2 may be executed for a predetermined plurality of distinct types of action, for example for a "catch" action, a "chase" action etc. In an embodiment a plurality of forty eight such action types is used. For each action type, a respective different set of support vectors may be used that is specific for the type of action, in combination with a respective bias and a set of support vector multipliers which may be for the type of action. In an embodiment, the way in which STIPs are assigned to bins may be made dependent on the type of action that is detected. i.e. it may be different for the detection of different types of action. In another embodiment, assignment of STIPs to bins may be the same for all types of actions, or at least for a plurality of types of action in a group of actions. Use of independent assignment of STIPs to bins for different types of action increases detection reliability, but use of shared assignment of STIPs to bins for a plurality of action types reduces computational load.

Distinct types of action may be detected sequentially, computer 19 each time loading support vectors, detection parameters, weight factors and parameters for quantization, to execute the steps of FIG. 2 for different types of action one after the other. Alternatively, distinct types of action may be detected at least partly in parallel by executing the steps of FIG. 2 for a plurality of classes in parallel.

The factors used in fourth step 24 of the process of FIG. 2 serve to raise the importance of selected feature bins for the detection with respect to other bins and/or to lower the importance of other feature bins. It has been found that video segments showing of actions, i.e. large numbers of images, often contain an overdose of features. By means of the factors that provide for different weights for counts in different bins and for different types of action, this overdose can be handled more reliably. In the embodiment wherein a common histogram with counts of STIP features is used for the detections of a plurality of types of action, or when similar quantization of description vectors into histogram bins is used for a plurality of types of action, the factors serve to create more different histograms as input for comparison with the support vectors.

As mentioned, the weight factors wi used in fourth step 24 may be dependent on the count of features in the bin i. A normalized count value may be used to select the weight wi, i.e. a ratio of the count value and a sum of the count values of all bins. This may be used for example to increase the weight factor wi of a bin i relative to that of other bins selectively with increasing normalized count value in the bin.

Such feature vector dependent weighting may improve classification, for example when a class covers video sequences with different clusters of similar sequences, in the case that each cluster is characterized by its own specific combination of feature vector component values. This has been found to occur often in action recognition from video data, because different subjects can walk differently, have different postures, speeds directions etc, even if they perform actions in the same class (e.g. walking). Classification can be improved by use of weighting to emphasize a specific subset of histogram bins that have been found to be characteristic of a specific cluster within the class. The use of vectors zji in the computation of the weight factors wi makes it possible to emphasize bins that are useful to detect feature vector in such clusters more reliably.

When count dependent weight factors are used, the weight factor wi of a bin i may be increased relative to that of other bins selectively with increasing normalized count value in the bin. The increase may be made dependent on whether there is a support vector that has a component corresponding to the bin i that is larger than the normalized count, or in proportion to the number of such support vectors.

In an embodiment, the weight factors wi in fourth step 24 are selected dependent on a normalized feature bin count pi in a bin i in the feature histogram obtained in third step 23 from the extracted parameter values obtained in second step 22. For example, the weight wi for a bin count Ni may be selected according to $$wi=|c(i)+\text{Sum alpha}(j)*\min(pi,zji)|$$

Herein the sum is taken over component values zji of a set of vectors labeled by j (i.e. the sum is over j), each vector having components for respective histogram bins labeled i. The "min" function produces the smallest of its two arguments as result. The coefficients c(i), alpha(j) and zji, which may be different from the vectors used in the support vector machine that performs the subsequent classification, may be selected using a support vector training process as will be described below. In an embodiment, the alpha(j) and zji values for determining the weights wi may be determined using a first SVM training process, applied to feature vectors composed of the normalized bin counts, and SVM detection may be used in fifth and sixth step 35, 36, using SVM support vectors and coefficients obtained in a second training step applied to feature vectors composed of the normalized bin counts multiplied by the weight factors wi.

As may be noted, the min(pi, zji) values increase with increasing pi as long as pi<zji, thus increasing the weight with increasing pi as long as pi<zji. In a surveillance system embodiment, video data from camera 11 is processed when it has been captured and detector 16 is coupled to an alert signal generator (not shown). The alert signal generator may be configured to compare detection results from detector 16 with a condition for generating an alert. The condition may specify a type of action for example, or a sequence of action types, optionally combined with further conditions. The alert signal generator may test whether detector 16 has detected a specified of action, or the actions from the sequence for example. When the alert signal generator detects that the condition for alert has been met, it generates an alert signal, such as a sound alarm for a human operator, or a visual signal obtained by feeding images from camera 11 to a display screen of an operator.

In another embodiment, the video processing system may be used as part of a system for retrieving video data. In this embodiment, a database is used with records that store action type codes in association with identifications of video segments in video data memory 10. Video data memory 10 may comprise a plurality of memory devices coupled via network, in which case the identifications of the video segments may include identifications of the devices, such as URLs or addresses. A search engine may be used, programmed to receive a search query from a user, the query indicating an action type and optionally other search terms. The search engine is configured to search the database for records that meet the query, e.g. because the records contain an action code matching the action type indicated in the search query.

In this embodiment the output of detector 16 may be used to generate the records. Video data that has been newly added to input video data memory 10 may be fed to the video processing system. The output of detector 16 may be connected to a database update module (not shown) coupled to the data base. The database update unit may be configured to add records to the database, including codes for action types detected by detector 16 in combination with identifications of the video segments for which they have been detected. In another embodiment, a search may be performed by retrieving video data from input video data memory 10, applying the retrieved video data to the video processing system, comparing the detection results of detector 16 to a term of a search query, and displaying video segments that have thus been found to match the query on a user display screen.

Figure 3:
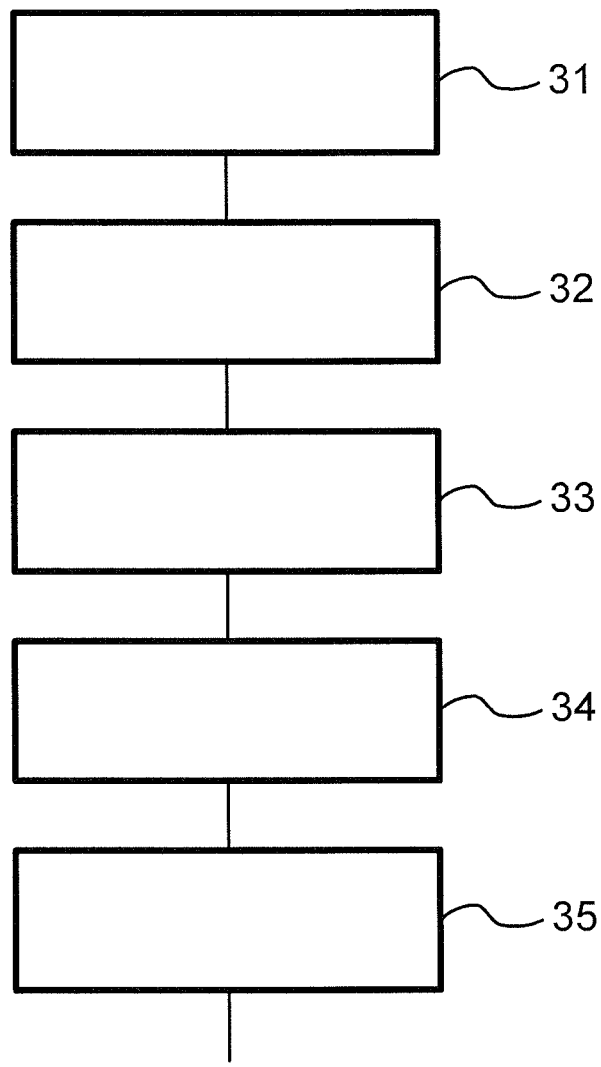
FIG. 3 shows a flow-chart of support vectors determination

FIG. 3 shows a flow chart of the determination of the support vectors and the parameters for human action detection. In a first step 31, a camera captures video sequences. In a second step 32, a human operator provides designations of video segments. The designations identify video segments and action type codes for those segments. In an embodiment a plurality of action type codes may be provided for a designated video segment. The action type codes belong to a predetermined set of action type codes. The designation connotes that identified video segment shows one or more humans performing an action. The action type code represents a type of action that the human operator has seen to be visible in the video segment. In a third step 33, a computer selects an action type for which the remaining steps are executed.

In a fourth step 34, the computer 19 selects a first and second set of training video segments from the designated video segments. For the first set, video segments that have been designated with the selected action type are selected. The video segments of the first set may be a randomly selected sub-set of the video segments that have been designated with the selected action type. For the second set, video segments that have not been designated with the selected action type are selected. The video segments of the second set may be a randomly selected sub-set of the video segments that have not been designated with the selected action type.

In a fifth step 35 the computer executes a training process to determine a set of support vectors, support vector multipliers and a bias value for detecting actions of this type from the first and second set of training video sequences. In an embodiment, parameters of the step of assigning description vectors to bins (third step 23 of FIG. 2) are determined as well, that is, codebook vectors or decision criteria of a random forest may be determined. Support vector training methods for doing this are known per se. Third to fifth steps 33-35 may be repeated for different types of action. In an embodiment, first and second step 31, 32 may be replaced by retrieval of a predetermined set of video segments with designations from a memory system.

The factors for use in fourth step 24 of the action type detection process are selected to reinforce the counts in the bins that have been found to contribute more to detection than other bins and vice versa. This may be realized by replacing fifth step 35 of the process of FIG. 3 by a two step training process, using fifth step 35 as an initial training process, the result of which are used by the computer to determine the relative importance of different bins of the feature histogram for the detection of an individual type of action, followed by a second training process that the computer applies to modified feature histogram bin contents. The computer obtains the modified bin contents by selecting the factors to be used in fourth step 24 according to the results of the initial training process. Various alternative ways of selecting the factors may be considered, with the common feature that larger factors are selected with increasing size of the contribution of the feature to the results of the initial training process.

Figure 4:
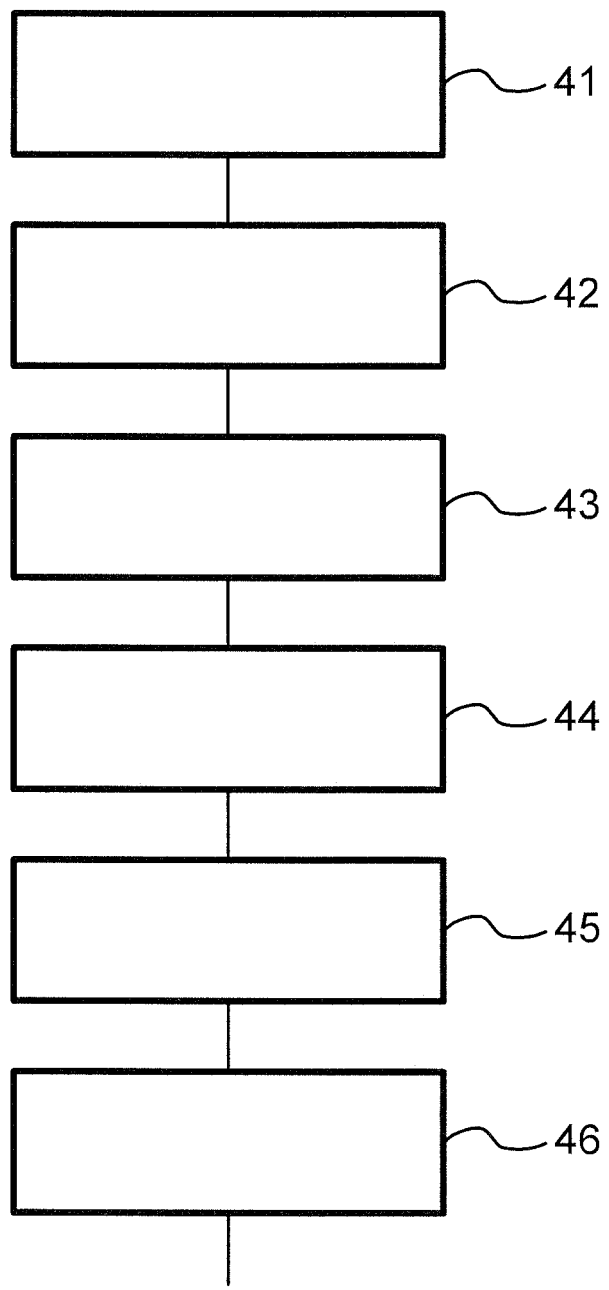
FIG. 4 shows a flow chart of factor selection

FIG. 4 shows an illustration of an embodiment. Initially, a computer performs steps similar to third and fourth steps 33, 34 of the process of FIG. 3. The video sequences and designation may be retrieved from a memory device, or obtained with steps similar to first and second step of those of FIG. 3.

In a first step 41, similar to fifth step 35 of FIG. 3 the computer executes a training process that determines a set of support vectors, support vector multipliers and a bias value for detecting actions of this type from the first and second set of training video sequences. In an embodiment, the computer determines parameters of the step of assigning description vectors to bins (third step 23 of FIG. 2) as well, that is, codebook vectors or decision criteria of a random forest may be determined. Support vector training methods for doing this are known per se.

In the embodiment wherein the weight factors $w_i$ of the fourth step 24 of FIG. 2 are selected dependent on the feature bin counts $p_i$ in the feature histogram obtained in third step 23, the support vectors and corresponding support vector coefficients $alpha(j)$ selected in first step 41 may be used for the $z_{ji}$ values for determining the weight factors $w_i$ of the fourth step 24, The bias coefficient $c(i)$ for the bin may be selected based on a bias selected in first step 41, as will be discussed in the following.

In a second step 42, similar to fourth step 34 of FIG. 3, a third set of training video sequences is provided, with action type codes matching the selected action type for which the process is performed. In an embodiment, the first set may be used as third set, alternatively the computer may generate the third set by randomly selecting training video sequences with action type codes matching the current action type.

In a third step 43 the computer determines the factors "w", which act as parameters to adjust the size of the contributions that STIPs make to bin values. This step is illustrated for an embodiment wherein the comparison with each support vector "j" is performed as a sum over the bins "i" of the feature histogram of "$min(p_i, z_{ji})$", the lowest of the bin value $p_i$ and the value $z_{ji}$ of the support vector for that bin. In this embodiment, the factor w for a bin may be computed as the absolute value of an average: $|<v>|$ of a quantity v, where $$v = c + \text{Sum } alpha(j) * min(p_i, z_{ji})$$

The average being taken over bin contents $p_i$ for the bin obtained from video sequences from the third set, using quantization parameters as determined (or at least used) in first step 41. In the expression for the terms "v" that are averaged, addition of a bias "c" is optional. In an embodiment, the same bias value c is used for every bin. The "min" (minimum) function is used as a score for the match between $p_i$ and $z_{ji}$. The sum is taken over the support vectors "j" determined in first step 41, using support vector multipliers $alpha(j)$ and values $z_{ji}$ of the support vectors as determined in first step 41 for the selected action type for which the factor w is computed.

As will be appreciated, this way of determining the factor w has the effect that the factor w for a bin i will increase or decrease the bin value in the bin i relative to the bin values of other bins i' according to whether the bin score v for the bin i is larger or smaller than the bin score v for the other bins i' respectively, or the absolute value $|v|$ is larger or smaller.

In a fourth step 44, a fourth and fifth set of training video segments is provided, selected from the designated video segments. The computer may generate the fourth and fifth set from the available video segments. For the fourth set, video segments that have been designated with the selected action type are selected. For the fifth set, video segments that have not been designated with the selected action type are selected. The same type of selection method may be used as in fourth step 34 of the process of FIG. 3. In an embodiment, the first and second set may be used as fourth and fifth set.

In a fifth step 45, the computer executes a training process that determines a new set of support vectors, support vector multipliers and a bias value for detecting actions of this type from the fifth and sixth set of training video sequences. The parameters of the step of assigning description vectors to bins are not changed, but for each bin the computer multiplies the counts in the bin, as obtained with this step for the training video sequences in the fourth and fifth set, by the w factor obtained for that bin in third step 43, before the computer uses the counts to determine a new set of support vectors, a new bias b and new support vector multipliers alpha(j). Support vector training methods for doing this are known per se.

The computer subsequently supplies the new support vectors zji, new bias b and new support vector multipliers alpha(j) resulting from fifth step 45 to support vector memory 17 and detection parameter memory 18. The computer supplies the factors w from third step 43 to weight memory 14. The computer may supply these parameters directly, or indirectly by writing the parameters to a machine readable memory device, from which a control computer (not shown) of the video processing system of FIG. 1 loads them into support vector memory 17, detection parameter memory 18 and weight memory 14. Hence these parameters are used in the process of FIG. 2. The factors w are used as factors in fourth step 24.

As may be noted the process of FIG. 4 uses the results of an initial training step (first step 41, similar to fourth step 34) to select factors w for individual bins "i" for individual action types. Next a new training step (fifth step 45) 45 is used to determine the parameters for use in actual action type detection, based on bin description vectors that have been multiplied by the factors w.

Experimental results will be discussed that illustrate that this results in increased recognition liability for at least some types of action. Although the results concerns the specific embodiment that has been described for computing the factors, it should be noted that similar improvements may be obtained by other ways of determining the factors. What contributes to increased reliability is that the factors w are made relatively larger for bins for which the values "v" are larger than in other bins for the action type that is detected. Instead of using factors w that are equal to the absolute value of the average $|\langle v \rangle|$, w may be determined using another increasing function of the absolute value of the average (or an increasing function that may remain constant for some ranges of values of the average). Similarly, instead of the average another measure of the size of the values v may be used, e.g. a median value, an average of squares of v, a weighted average wherein different values of v may be given different weights etc. The process of selecting the third set may be adapted to influence the factors. For example, a human operator may select video sequences that are not yet detected reliably with the parameters obtained from first step 41.

In an embodiment a further step is added to the process of FIG. 4, wherein the computer determines bias values c for different bins of the feature histogram for use in third step 43. Preferably, this is done in such a way that the bias values of all bins sum to the overall bias value "b" for the action type that was determined in second step 42. In a first embodiment, the computer equally distributes the bias values over the bins: c=b/m, where m is the number of bins in the feature histogram, i.e. the number of bins to which a detected STIP can be assigned.

It has been found that detection reliability at least for some types of action can be improved by use of a different selection of the bias values c. In a second embodiment, the computer distributes the bias values over the bins in proportion to an average "mu" of normalized count values in the bins (bin dependent, so mu is a function mu(i) of the bin(obtained by applying spatiotemporal feature detection, description vector extraction and feature binning to video sequences in a training set that show actions of the type for which a detector is constructed: c=b×mu(i). Herein the values mu(i) is normalized so that their sum equals one. The training set may be the first set provided in first step 31, or a different set of video sequences in a training set that show actions of the type for which a detector is constructed.

In a third embodiment, the computer distributes the bias values over the bins in proportion to the contents pi of the bins: c=b×pi, with pi normalized so that they sum to one.

In a further embodiment a choice is made between the different methods of selecting the bias values dependent on the type of action for which a detector is constructed. To do so, the process is executed for each of a plurality of predetermined types of actions. This process comprises selection of different sets of bias values "c" for the bin, for example using respective ones of the methods described above, each followed by execution of third to fifth steps 43-45 using the selected bias values "c". In a next step of this process a measure of reliability is computed for detection of the presence of actions of the predetermined type obtained by detection using respective ones of the sets of bias values c. The results obtained with set of bias values that results in the highest values of the measure of reliability is then selected for use in detection. This has been found to produce a significant improvement in detection reliability. In an embodiment, other aspects may be varied as well, e.g. parameters that affect the selection of the weights w(i) as a function of the values of v, the results obtained with parameters that results in the highest values of the measure of reliability being used in detection.

In an embodiment, position information of the detected STIP features is used as well. This is optional. In this embodiment, at least part of the bins of the feature histogram is associated with spatiotemporal coordinates (xi,yi,ti) for the individual bin i, as well as with spatiotemporal scale factors sx, sy, st, which may be the same or different for different bins. Instead of scale factors an inverse scale matrix R may be used, the diagonal elements of this matrix corresponding with the inverted squares of the scale factors when spatiotemporal scale factors are used.

In this embodiment, first step 21 of FIG. 2 comprises determining the spatiotemporal points (a combination of x, y and t coordinates) in a video sequence where of detected STIP feature occur. In third step 23, counting is replaced by summing contributions, the contribution for each detected STIP feature being computed as a function of the difference between the detected spatiotemporal coordinates of the detected STIP feature and the spatiotemporal coordinates (x,y,t) of the bin to which the feature is assigned, scaled by the scale factors. A Gaussian contribution G may be used $$G(x-xi, y-yi, t-ti) = \exp(-(x-xi)*(x-xi)/(2*sx*sx)-(y-yi)*(y-yi)/(2*sy*sy)-(t-ti)*(t-ti)/(2*st*st))$$

the exponent being replaced by a scalar product (x-xi,y-yi, t-ti)*R*(x-xi,y-yi,t-ti) when a scale matrix R is used. The multiplication of fourth step 24 may be integrated with the computation of the contributions, the contributions of individual features in a bin being multiplied by the factor for the bin. In the process of FIG. 4, the spatiotemporal coordinates (xi,yi,ti) for the individual bin i may be determined from an average of the spatiotemporal coordinates (x,y,t) of the features in the bin from the third set. Similarly, fifth and sixth steps 45, 46 of FIG. 4 may be implemented by summing spatial contributions before training the new support vectors etc.

In another embodiment, the contributions may be computed as a sum of contributions that are each a function of the difference between a respective one of a plurality of reference coordinates (xiu, yiu, tiu) for the bin i. A sum of Gaussian contributions G(x-xiu, y-yiu, t-tiu) may be used, the reference coordinates (xiu, yiu, tiu) being taken from examples in the third set, or averages of clusters of such examples.

As used herein, detection of presence of an action in a video sequence means computation of a detection result from video data in the sequence. Video data is data that represents a sequence of images captured for successive time points. Spatiotemporal points are points in time and space, e.g. in a time and space defined by the two dimensional space of the images and time values defined by the positions of images in the succession of images. Spatiotemporal points of interest are spatiotemporal points that have been detected by applying a detector to the video data: the word "interest" is a label for this that does not reflect properties of the way in which the points of interest are detected. Examples are points on detected edges in the images and/or detected corners in an image or in an r-t plane formed by points r on a line in a series of images for different time values. A 2D or 3D Harris or SIFT DoG detector may be used for example.

Feature data is data that has been derived from the video data from a selected area, a position of which is selected dependent on a detected spatiotemporal point. Extraction of feature data is the determination of the feature data from the video data. The word feature is a label that does not reflect properties of the way in which the feature data is determined. The feature data can be a vector of derived data values with an arbitrary number of vector components. Feature value bins are different ranges of values of feature data in a (vector) space of data values. A feature histogram is a set of bin values for respective ones of the bins. Feature data itself can comprise a histogram of values derived from the video data, such as a histogram of pixel values, but this is distinct from the feature histogram.

A bin value may be a count computed for a bin, i.e. effectively a sum of one and zero values for respective features, dependent on whether the feature has feature data within the range of the bin. However, instead of ones and zeros, other contributions may be summed. The contributions are numbers, with an adjustable size, adjustment of the size may involve multiplying by a factor, of computing another function of a count for the bin. Such a factor is an example of a parameter. More generally a function may be used that depends both on the count and a parameter. The adjustment is bin dependent in the sense that different adjustments may be used for different bins, for example because different parameter values may be used for different bins.

A match score is a number that is computed from the feature histogram. The word match is a label to reflect its purpose, but not the way in which the match score is computed. A bin score is a number computed for a bin. The terms bin score and bin values are used as labels to distinguish different numbers. The bin score need not be obtained by adjusting a count, and the bin score may be computed using a plurality of video sequences, unlike the bin value.

This will be elaborated in the following part of the text. The amount of video data that arises from camera networks (e.g. surveillance) is increasing daily. This poses a challenge on extracting information from this huge bulk of data. One important search capability is to retrieve from a video database the subset of video fragments where a particular human action occurs. An example is to retrieve a fragment where somebody exchanges an item with another person. The nature of the search queries may be very dependent on the application. To facilitate a wide range of applications, we use an example of retrieval of 48 generic human actions from a large video database, where some actions involve other persons, items or interactions with the environment.

Videos that are produced by camera networks have in common that they are unconstrained. They can be recorded in any place, and with any sort of content: what happens in front of the camera is not controllable. State-of the-art detection of human actions from such videos is not very reliable yet, due to the tremendous variations in the appearance of the action itself—the way that the action is done—but also the variations of the persons, background clutter, etc. The main challenge is how to extract reliable and informative features from the unconstrained videos.

Promising results have been achieved for human action detection in constrained settings, such as where the number of actions was limited [1], or the variations of the actions was constrained [2], or the background was fixed [3]. The key components of a robust action detection system are: robustness/invariance of the features to changing recording conditions, sensitivity to the motion patterns and appearance, selectivity of the feature representation for the current action, and good discrimination between the positives and negatives by a robust classifier. Advanced and well-engineered action detectors have been proposed recently. The representation of a person's trajectory has enabled storyline generation [4] and textual descriptions [5]. In [6] the layout of the scene is exploited to interpret trajectories and actions. Most recently, the Action Bank detector [7] has been able to learn new actions based on a rich bank of many other actions under various viewpoints and scales. Yet, simple bag-of-features action detectors e.g. [8] have demonstrated to be also very effective for the task of action detection e.g. [9, 10]. Their advantage is simplicity, straightforward implementation, and computational efficiency. Bag-of-features action detectors are constructed by combining some spatiotemporal feature, a codebook or quantizer to transform the features into histograms as a means to represent a (part of a) video, and a classifier to detect the action. As reported in [10], such a bag-of-features detectors proved to be effective for a range of actions including quite complex action such as digging in the ground, falling onto the ground, and chasing somebody. Yet, for the detection of more complex actions, such as the exchange of an item, or burying or hauling something, the standard bag-offeatures action detectors did not suffice [10].

In an embodiment, we consider an extension to the standard bag-of-features action detector. One of the reasons that the detection of exchange, bury or haul is hard, is that these actions involve detailed motion patterns and their duration is short. The large part of the total set of features is triggered by irrelevant actions that precede or follow the detailed action (e.g. walking) or by background clutter (e.g. a person moving in the background). The relevant subset of features is likely to be a small fraction of the total set. To solve this issue, we propose an embodiment that uses a spatiotemporal saliency map. Its purpose is to improve the selectivity of the feature representation by weighting each feature by its relevance for the action of interest. The spatio-temporal saliency of the embodiment depends on the current video as well as the current action of interest. A simple weighting scheme is used that is easy to implement, computationally efficient, and deployable for the retrieval/detection of a wide range of actions. We demonstrate that in a bag-of-words setup, the retrieval accuracy can be drastically improved by the proposed spatio-temporal saliency map.

In Section 2, we summarize related work and indicate which elements we re-use from the action detection literature and where we extend beyond current literature with respect to visual saliency. Section 3 describes our spatio-temporal saliency map and we describe how it can be implemented in a few simple steps. Section 4 contains the experimental results and we highlight the key improvements with respect to the standard bag-of-features detector. In Section 5 we conclude and summarize our main findings.

2 Related Work

2.1 Bag-of-Features Action Detectors

A spatio-temporal saliency map for bag-of-features action detectors is considered. The key elements of this class of action detectors will be summarized. The bag-of-features model [11] defines a pipeline from features to histograms which are assigned a class label by some classifier. For action detection, the classifier serves simply as a detector that discriminates between the target action vs. the background of negatives. To capture the motion patterns of human actions, STIP features [12] proved to be very effective. An excellent performance evaluation of local motion-based features and sampling methods is presented in [9]. STIP features were found to be superior to alternative local features [9] and also to bounding-box based features [13]. The next step is to construct a feature representation for each (part of a) video. In the bag-of-feature model, this is done either by a codebook of representatives/prototypes of the features e.g. [9] or by a quantizer such as a random forest e.g [14]. The random forest proved to more distinctive in [10], so this is our preferred quantizer. The final step is the classifier which serves as the action detector. We select the SVM for this purpose, due to its robustness to large feature representations and sparse labels. An essential part of the SVM is the choice of the kernel. For object retrieval [15] and action detection [10] the $X^2$ kernel proved to be very distinctive. Unfortunately, it is a computationally expensive kernel. For large-scale datasets like Pascal VOC, TRECVID, and the large video database considered in the experiments, the much more efficient intersection kernel has regained interest, at the cost of a slight performance loss [16]. For the purpose of proposing a simple and efficient method for large video databases, we select the intersection kernel.

2.2 Visual Saliency

Computational models of spatial saliency for computer vision started with the per-pixel assessment of saliency, based on low-level features such as color contrast, edges and textures [17]. This type of saliency was pixel-based and generic. A different approach was taken in [18], where saliency was defined to be feature-based rather than pixel-based. Another difference was that this feature-based saliency was not generic, rather it was designed with the specific purpose of aiding the discrimination task. Therefore, it was coined discriminative saliency. We adopt this interpretation of saliency: we aim to find the relevant features that capture the distinctive properties of the action of interest. In [19, 20], explicit maps were produced to search for the relevant parts in the image to perform visual classification. A disadvantage of both methods is that the learned map for a particular class yields the same saliency values for each image. Saliency maps that are both class and image specific were proposed in [21]. Here, the saliency map serves as a weighting function to determine for each image specifically the contribution of features. The rationale in [21] is that both spatial and visual saliency are important.

Our approach differs in two ways, however. The first difference is that we do not couple the learning of saliency and the complete learning of the class, because it makes the learning phase and the implementation of the saliency algorithm more complex. We will propose a simple way to learn and compute the saliency. In an embodiment we extend the spatial saliency map to the spatio-temporal domain. Spatio-temporal regions of interest have been addressed in [22]. A foreground region in the space-time volume was identified for each action by applying PageRank on local features in the videos. The rationale was that the background can vary significantly even for the same type of actions in unconstrained videos and that it should be removed. Likewise, in [23], STIP features in the background were removed by an advanced scheme. First in each frame spatial interest points were detected, then background suppression was performed by a center-surround suppression mask. Finally local and temporal constraints were imposed to remove the STIP features in the background.

We give high weights to relevant features both in the foreground and in the background. Hereby we explicitly exploit the property that some features aid in deciding that this video contains the action of interest, and that other features aid in deciding that it does not contain the action of interest. We directly exploit the distinctiveness of each of the features in the video, without making assumptions on foreground and background.

3 Spatio-Temporal Saliency Map

3.1 Individual Feature Relevance for the Action

Our notion of a feature's relevance for the action of interest, is based on three observations. In the explanation and derivation of the equations, we will introduce variables which will keep their meaning throughout this section. The first observation is our starting point: an SVM classifier can be trained to distinguish an action based on histograms of features from videos [2, 8, 9, 10, 13]. In an embodiment, the training of a SVM is based on histograms obtained from quantization of STIP features via a random forest. The procedure is detailed in [10]. The distances between these histograms are defined by the histogram intersection kernel:

$$k(p,q) = \text{Sum min}(p_i, q_i) \quad (1)$$

With k the kernel, the sum being taken over histogram bins indexed by i, $p_i$ and $q_i$ being the contents (e.g. counts) in of the ith histogram bin of histograms p and q. Our SVM is clearly a model with an additive kernel. The second observation is that this SVM model can be rewritten as a combination of support vectors, their coefficients, the histogram of features, and the kernel [25, 26]. The decision function makes use of a set of n support vectors. Each support "z" vector is a respective reference histogram. The index j will be used to indicate the individual support vectors zj, the content of the ith bin of the jth support vector being denoted zji. The decision function of the SVM is:

$$f(p)=b+\text{Sum alpha}(j)k(p,zj) \quad (2)$$

where f is the SVM's decision function; with p the current histogram to be classified, and b the bias of the decision function, the sum is taken over the set of support vectors zj, alpha(j) being a weight coefficient of the jth support vector, and k being the kernel function. In the case of an intersection kernel as described in equation 1, Equation 2 can be rewritten as [25]:

$$f(p)=b+\text{Sum alpha}(j) \times \{\text{Sum min}(pi,zji)\} \quad (3)$$

where the first sum is taken over the set of support vectors, indexed by j, the second sum is taken over the histogram bins indexed by i, and zji is the content of the ith bin of the jth support vector. Indeed the SVM's decision function is a combination of a bias term, support vectors, their coefficients and the current histogram.

The third observation is that the support for the SVM's decision can be attributed to the bins of the histogram, because the other elements of the linear combination in Equation 2 (i.e. support vectors, coefficients, and kernel) are known after the learning phase [16]. In [16], the support of the histogram bins was defined in a relative manner for visualization purposes only. There, the bias b of the SVM's decision function was not accounted for. In an embodiment, we will use an absolute value for the support of each histogram bin, because we will combine them into a single saliency map. For that purpose, we need to account for the bias, in such a way that we achieve the following. Our notion of the support is that it is larger than zero if the contribution of the feature is positive (i.e. the action is present) and smaller than zero if negative (absent). Larger support values, positive and negative, indicate more contribution contribution to the respective decision. The support s(xi) of each histogram bin i for the SVM's decision is defined by:

$$s(pi)=c(pi)+\text{Sum alpha}(j) \times \min(pi,zi) \quad (4)$$

with the sum being taken over support vectors indexed by j, zji being the value of the ith bin of the jth support vector, and s(pi) a part of the bias b from Equation 2, under the constraint:

$$b=\text{Sum } c(pi) \quad (5)$$

Herein the sum is taken over histogram bins indexed by i. Note that indeed the sum over all bins i of Equation 4 equals the SVM's decision function of Equation 3. There are three regimes to divide the bias b into the s(xi):

1. uniform across the bins:

$$c(pi)=b/m \quad (6)$$

2. by prevalence of each bin across the train set:

$$c(pi)=b \times Mu(pi) \quad (7)$$

with Mu(pi) the average of the ith bin's values. Because the histograms are normalized to one, the Mu(pi) across all bins sum to one by construction.

3. by the contents of the histogram bin:

$$c(pi)=b \times pi \quad (8)$$

where again the pi sum to one by construction. Our spatio-temporal saliency map is constructed by assigning to each individual feature in the current video its contribution to the SVM's decision. We call this the support of the individual feature. We can do this because we know which individual feature was quantized into which bin. The support v of a feature fik, i.e. the kth feature that was quantized into bin i is:

$$Nu(fik)=s(pi)/r \quad (9)$$

with r the total number of features that have been quantized into bin i.

With the proposed computation of an individual feature's support, we take advantage of two properties. The first is that we incorporate the SVM's discrimination function, where we take directly advantage of the separating hyperplane between the action and non-action, rather than a derived measure of saliency. Secondly, we extend beyond a single-feature measure of saliency. We take advantage of the full set of features in the current video and the dataset, because we determine the support for the histogram bin first, before assigning the support of individual features. rather than a single-feature based saliency.

3.2 Computation of the Saliency Map

The support values Nu(fik) are considered in a scale-space framework [27], to enable reinforcement of salient features that are together in a region. Our expectation is that there may be a foreground (i.e. the action itself) and the background (other activity). If there is such a foreground vs. background distinction, then these become regions-of-interest in the space-time volume. In our saliency map, regions-of-interest are addressed by a gaussian window around the feature points in the space-time volume. This window sums the support of individual features and reinforces salient features that are close together. The summation is done per feature histogram bin, as we want to avoid regional cancellation that is caused by mixing positive and negative support of different bins. For one individual feature, the summation in the gaussian window is defined by the following equation, where we call the resulting value the weight w(fik):

$$w(fik)=Nu(fik) \times \text{Sum } Wx(xik-xiu) \times Wy(yik-yiu) \times Wt(tik-tiu) \quad (10)$$

Herein the sum is taken over features u of sets of reference coordinates (xiu, yiu, tiu) for histogram bins, Wx, Wy, Wt being Gaussian factors, i.e. each an exponent of minus the square of its argument divided by a twice a scale for the x, y and t coordinate respectively. This results in a gaussian envelope over the spatial and temporal differences with respect to the point in the space-time volume of the current feature fik, where x is the horizontal position, y the vertical position (both in pixels) and t the time (in frames). This window accumulates envelope values over all r features (indexed by u) that have been quantized into bin i.

The spatio-temporal saliency map is a weighting scheme that boosts the relevant features in the feature histogram. As a first step, the weights of the individual features are combined into a single weight w(pi) for each bin i for each histogram p:

$$W(pi)=\text{Sum } w(fiu) \quad (11)$$

The sum being taken over features u. In the final step, each histogram bin pi is multiplied by its positive weight W, by taking the absolute value:

$$pi'=pi \times |W(pi')| \quad (12)$$

where pi' is the new histogram value at bin i. The salient features will boost particular bins in the histogram. For the computation of this spatio-temporal saliency map, there are two parameters: the regime for dividing the bias across the features (Equations 6-8), and the spatio-temporal extent of the map by the size of the gaussian window (Equation 10).

4 Retrieval of 48 Human Actions

4.1 Experimental Setup

As a large video database of many diverse and complex human actions, we consider the visint.org database [24]. It contains 3,480 movies of 48 human actions in highly varying settings. The variations are: scenes, recording conditions, viewpoints (yet static cameras), persons, and clothing. Each video has been annotated for all 48 actions, where the annotator indicated presence or absence of the action. On average, 7 actions have been indicated to be present in a video. We perform experiments on the retrieval of each of the 48 actions.

For each action, we repeat the experiment 5 times, where each repetition uses a randomized train set (50%) and test set (50%). We report the performance on the test set, where we indicate the average and the standard deviation of our performance measure. Our performance measure is Matthews Correlation Coefficient (MCC), because it is independent of the prevalence of an action. The prevalence of the actions varies highly: 'move' occurs in 75.4% of the movies, where 'bury' occurs only in 1.8% of the movies. The meaning of the MCC is as follows: a score of 1 (−1) indicates perfect positive (negative) correlation between the action detector and the annotations, where a score of 0 indicates no correlation with the annotations.

The retrieval performance of the standard bag-of-features action detectors is compared against the extended detectors where the spatio-temporal saliency map has been added. For both methods, we consider the exact same randomization for each of the 5 repetitions of the retrieval experiment. The parameters of our spatio-temporal saliency map are the bias regime (uniform, prevalence, histogram; see Equations 6-8) and the spatial and temporal scale of the map (Equation 10). The spatial scales are taken to be isotropic: the same scales being used for each spatial coordinate, because different scales in x- and y direction do not significantly impact the results. The scales are varied: $\sigma_{xy}=[1, 5, 10]$ pixels, and $\sigma_t=[1, 5, 10]$ frames. Other variations of the scales did not significantly impact the outcomes of our experiments (data not shown). The video size is 1280×720 pixels and the duration ranges from 3 to 30 seconds at 30 fps.

4.2 Organization of the Results

For each of the 48 human actions, we summarize the retrieval performance in Table 1. Column 1 lists the actions. The prevalence of the action in the database is indicated in column 2; it is clear that the prevalence of actions varies severely, ranging from 1.8% to 75.4%. Column 3 indicates the median number of STIP features found in the movies where the action occurs; clearly some actions contain few features ('give') due to their short duration and subtle motion, where others trigger many features ('haul'). The performance of the standard bag-of-features action detectors is listed in column 4. The performance of the extended detectors tat include the spatio-temporal saliency map, is listed in column 5. Columns 6 and 7 indicate the spatial and temporal scale of the saliency map (see Section 3.2), and column 8 indicates how the bias has been spread over the features (see Section 3.1). We have varied the scale and bias parameters and report the best result here. Column 9 contains the merit that is gained by extending the bag-of-features action detectors by the spatio-temporal saliency map. Table 1 highlights for each action the method that performs best (i.e. with or without saliency) by an indication of the MCC score in bold (column 4 or 5). Further, Table 1 highlights whether the improvement by using the saliency map is significant (gain in MCC>0.05) in the last column.

4.3 Findings

The first finding from Table 1 is that many actions could not be retrieved at all by the standard bag-of-features action detectors—yet these can be retrieved with reasonable precision when the saliency map is added. These actions are: attach (0.09, was 0.00), catch (0.11, was 0.01), exchange (0.13, was 0.00), get (0.10, was 0.01), hand (0.14, was 0.01), haul (0.18, was 0.00), hit (0.14, was 0.00), kick (0.21, was 0.03), push (0.09, was 0.02), putdown (0.13, was 0.00), replace (0.17, was 0.03), snatch (0.12, was 0.00). This result is important, as these are exactly the interesting yet complex actions that involve interactions with items in the environment.

The second finding is that 40 out of the 48 actions are improved, and that 25 are improved significantly (MCC increase >0.05), whereas the degradations for 8 out of 48 actions are not significant (MCC decrease <0.05). The degradations occur systematically for the actions that already had a good performance without saliency map. We conclude that the saliency maps achieve a systematic improvement across the board and significant improvements for 25 actions.

The third finding is that by adding the saliency map 13 actions now achieve a reasonable retrieval performance. To that end, we consider actions that are improved significantly (MCC increase >0.05) and that now get a score of MCC>0.20. These actions are: bury, enter, exit, flee, kick. Actions that have improved significantly and now get a score of MCC>0.15 are: bounce, close, collide, give, haul, receive, replace, take. These actions have in common that they are hard to recognize because they involve subtle motion and have a short duration. Moreover, they typically have low prevalence in the dataset so there are relatively few examples to learn from. Finally, they involve interactions with usually small items which are hard to detect.

The fourth finding is that the spatio-temporal extent of the map, by means of the gaussian windows, matters. For 17 out of 48 actions, the scale in either the spatial and/or temporal dimension is >5 pixels or frames. The fifth finding is that the average improvement across the board is 35.3%, from an average MCC=0.16 for the standard bag-of-features action detectors, to MCC=0.22 with inclusion of the proposed spatio-temporal saliency map.

5 Conclusions

The retrieval of videos that contain a particular human action has been addressed. The retrieval of complex actions, e.g. a person who is replacing an item, is hard due to short duration and subtle motion. Additionally, such complex actions do not occur often, which leads to a small set of positive samples, further complicating the learning and retrieval. These challenges imply a need to find the relevant features in the midst of all features in a video fragment. As a solution, we have proposed a saliency map to increase the selectivity of the feature representation. In our experiments, we evaluate the retrieval of 48 human actions in 3,480 movies. These movies are challenging as the actions vary highly in complexity and prevalence, ranging from a walking person (simple and high prevalence) to two persons who exchange an item with each other (complex and rare). Moreover, the scenes, recording conditions, viewpoints (yet static cameras), persons and their clothing also varies. In an embodiment a bag-of-features actions detectors was used for each action and extend these with the action-specific specific and video specific spatio-temporal saliency maps. The proposed saliency map is a simple weighting scheme that is easy to implement, computationally efficient, and deployable for the retrieval/detection of a wide range of actions. We have demonstrated a systematic improvement across the board of 35.3% on average and significant improvements for 25 out of 48 actions. The improvements are achieved in particular for complex human actions such as giving, receiving, burying and replacing an item.

TABLE 1

MERIT OF SPATIO-TEMPORAL SALIENCY FOR RETRIEVAL OF HUMAN ACTIONS

| Human Action | Prev. | Feat. | Standard | Saliency | $\sigma_{xy}$ | $\sigma_t$ | Bias | Merit |
|---|---|---|---|---|---|---|---|---|
| Approach | 34.3% | 373 | 0.31 ± 0.01 | 0.30 ± 0.04 | 10 | 5 | histogram | −0.01 |
| Arrive | 22.5% | 412 | 0.33 ± 0.02 | 0.36 ± 0.01 | 1 | 1 | uniform | +0.03 |
| Attach | 7.5% | 232 | 0.00 ± 0.02 | 0.09 ± 0.03 | 1 | 1 | uniform | +0.09 |
| Bounce | 8.8% | 282 | 0.09 ± 0.02 | 0.15 ± 0.09 | 1 | 1 | histogram | +0.06 |
| Bury | 1.8% | 242 | 0.14 ± 0.12 | 0.22 ± 0.09 | 1 | 1 | prevalence | +0.08 |
| Carry | 13.1% | 358 | 0.16 ± 0.01 | 0.19 ± 0.02 | 5 | 1 | prevalence | +0.03 |
| Catch | 5.0% | 260 | 0.01 ± 0.02 | 0.11 ± 0.07 | 1 | 1 | uniform | +0.10 |
| Chase | 4.0% | 455 | 0.27 ± 0.06 | 0.29 ± 0.04 | 1 | 1 | uniform | +0.02 |
| Close | 6.4% | 200 | 0.06 ± 0.10 | 0.16 ± 0.03 | 1 | 1 | uniform | +0.10 |
| Collide | 11.5% | 256 | 0.08 ± 0.09 | 0.17 ± 0.01 | 1 | 1 | uniform | +0.09 |
| Dig | 3.1% | 202 | 0.26 ± 0.07 | 0.30 ± 0.03 | 5 | 10 | histogram | +0.04 |
| Drop | 9.7% | 207 | 0.05 ± 0.02 | 0.12 ± 0.04 | 10 | 1 | prevalence | +0.07 |
| Enter | 16.3% | 392 | 0.06 ± 0.02 | 0.20 ± 0.02 | 1 | 1 | uniform | +0.14 |
| Exchange | 4.3% | 233 | 0.00 ± 0.02 | 0.13 ± 0.02 | 1 | 1 | uniform | +0.13 |
| Exit | 12.8% | 461 | 0.17 ± 0.03 | 0.27 ± 0.03 | 1 | 1 | uniform | +0.10 |
| Fall | 11.9% | 204 | 0.26 ± 0.03 | 0.22 ± 0.02 | 1 | 1 | uniform | −0.04 |
| Flee | 5.2% | 418 | 0.19 ± 0.03 | 0.28 ± 0.02 | 5 | 5 | uniform | +0.09 |
| Fly | 8.9% | 210 | 0.16 ± 0.02 | 0.20 ± 0.03 | 1 | 1 | uniform | +0.04 |
| Follow | 9.4% | 585 | 0.26 ± 0.03 | 0.27 ± 0.03 | 1 | 1 | uniform | +0.01 |
| Get | 13.0% | 261 | 0.01 ± 0.04 | 0.10 ± 0.03 | 10 | 5 | histogram | +0.09 |
| Give | 7.4% | 150 | 0.08 ± 0.01 | 0.16 ± 0.04 | 1 | 1 | prevalence | +0.08 |
| Go | 47.7% | 385 | 0.55 ± 0.02 | 0.53 ± 0.03 | 1 | 1 | histogram | −0.02 |
| Hand | 7.0% | 139 | 0.01 ± 0.02 | 0.14 ± 0.05 | 1 | 1 | histogram | +0.13 |
| Haul | 5.1% | 489 | 0.00 ± 0.02 | 0.18 ± 0.05 | 1 | 1 | histogram | +0.18 |
| Have | 44.4% | 197 | 0.17 ± 0.03 | 0.19 ± 0.00 | 1 | 10 | histogram | +0.02 |
| Hit | 11.1% | 256 | 0.00 ± 0.03 | 0.14 ± 0.05 | 1 | 10 | histogram | +0.14 |
| Hold | 44.9% | 189 | 0.26 ± 0.02 | 0.27 ± 0.01 | 5 | 10 | histogram | +0.01 |
| Jump | 5.4% | 237 | 0.40 ± 0.06 | 0.39 ± 0.01 | 10 | 1 | uniform | −0.01 |
| Kick | 3.7% | 261 | 0.03 ± 0.05 | 0.21 ± 0.07 | 1 | 1 | uniform | +0.18 |
| Leave | 26.0% | 434 | 0.48 ± 0.01 | 0.47 ± 0.00 | 1 | 1 | histogram | −0.01 |
| Lift | 28.2% | 202 | 0.20 ± 0.02 | 0.21 ± 0.00 | 1 | 1 | uniform | +0.01 |
| Move | 75.4% | 249 | 0.04 ± 0.02 | 0.07 ± 0.01 | 1 | 1 | prevalence | +0.03 |
| Open | 10.7% | 245 | 0.15 ± 0.02 | 0.16 ± 0.06 | 1 | 1 | histogram | +0.01 |
| Pass | 24.4% | 391 | 0.20 ± 0.03 | 0.31 ± 0.02 | 1 | 1 | histogram | +0.05 |
| Pickup | 19.4% | 202 | 0.21 ± 0.02 | 0.23 ± 0.01 | 1 | 1 | uniform | +0.02 |
| Push | 14.5% | 306 | 0.02 ± 0.03 | 0.09 ± 0.01 | 1 | 1 | uniform | +0.07 |
| Putdown | 11.6% | 237 | 0.00 ± 0.03 | 0.13 ± 0.01 | 5 | 1 | uniform | +0.13 |
| Raise | 33.2% | 204 | 0.26 ± 0.01 | 0.25 ± 0.01 | 5 | 1 | uniform | −0.01 |
| Receive | 11.5% | 164 | 0.08 ± 0.07 | 0.15 ± 0.02 | 1 | 1 | histogram | +0.07 |
| Replace | 5.0% | 413 | 0.03 ± 0.06 | 0.17 ± 0.05 | 5 | 1 | prevalence | +0.14 |
| Run | 8.2% | 459 | 0.56 ± 0.03 | 0.55 ± 0.04 | 1 | 1 | uniform | −0.01 |
| Snatch | 9.2% | 159 | 0.00 ± 0.03 | 0.12 ± 0.03 | 1 | 1 | uniform | +0.12 |
| Stop | 36.2% | 248 | 0.15 ± 0.01 | 0.16 ± 0.01 | 10 | 1 | histogram | +0.01 |
| Take | 19.9% | 190 | 0.04 ± 0.01 | 0.15 ± 0.02 | 1 | 1 | uniform | +0.11 |
| Throw | 6.1% | 231 | 0.05 ± 0.04 | 0.11 ± 0.03 | 5 | 5 | uniform | +0.06 |
| Touch | 54.7% | 215 | 0.26 ± 0.02 | 0.26 ± 0.02 | 10 | 10 | uniform | +0.00 |
| Turn | 39.4% | 280 | 0.18 ± 0.01 | 0.20 ± 0.01 | 5 | 1 | prevalence | +0.02 |
| Walk | 28.2% | 472 | 0.54 ± 0.02 | 0.53 ± 0.02 | 1 | 1 | histogram | −0.01 |

In an embodiment a method of automated detection of presence of an action of a predetermined type of action from video data, the method comprising the steps of detecting spatiotemporal points of interest in the video data;

extracting feature data from the video data in spatiotemporal areas at the detected spatiotemporal points of interest;

assigning the detected spatiotemporal points of interest to bins in a feature histogram based on the extracted feature data;

computing bin values of the feature vector for each respective bin, the bin value of each bin being computed from a sum of contributions of spatiotemporal points of interest that have been assigned to the bin, with a bin dependent adjustment of a size of the sum and/or the contributions of at least one of the bins dependent on the predetermined type of action;

performing a computation of a match score, such as a support vector machine match score computation, by computing scores between the feature vector and each of a plurality of reference vectors for the predetermined type of action, and summing products of the scores with factors for the reference vectors.

In an embodiment a video action detection system for detecting presence of an action of a predetermined type of action from video data is provided, the system comprising a source of video data or video data input;
a spatiotemporal interest point detector coupled to the source of video data or video data input;
a feature data extractor coupled to the source of video data or video data input and the spatiotemporal interest point detector, configured to extract feature data from video data from the source of video data or video data input at spatiotemporal interest points detected by the spatiotemporal interest point detector;
a feature data quantizer coupled to the feature data extractor and configured to assign the extracted feature values to bins of a feature vector;
a computing circuit configured to compute bin values of the feature vector for each respective bin, the bin value of each bin being computed from a sum of contributions of spatiotemporal points of interest that have been assigned to the bin, with a bin dependent adjustment of a size of the sum and/or the contributions of at least one of the bins dependent on the predetermined type of action; computing circuit comprising a match score computation module, such as a support vector machine, configured to compute scores between the feature vector and each of a plurality of reference vectors for the predetermined type of action, summing products of the scores with factors for the reference vectors.

REFERENCES

[1] T. Guha, R. K. Ward, "Learning Sparse Representations for Human Action Recognition," IEEE Transactions on Pattern Analysis and Machine Intelligence, 2012.

[2] C. Schuldt, I. Laptev, B. Caputo, "Recognizing Human Actions: A Local SVM Approach," International Conference on Pattern Recognition, 2004.

[3] L. Gorelick, M. Blank, E. Shechtmanm, M. Irani, R. Basri, "Actions as Space-Time Shapes," IEEE Transactions on Pattern Analysis and Machine Intelligence, 2007.

[4] A. Gupta, P. Srinivasan, J. Shi, L. S. Davis, "Understanding Videos, Constructing Plots: Learning a Visually Grounded Storyline Model from Annotated Videos," International Conference on Computer Vision and Pattern Recognition, 2009.

[5] P. Hanckmann, K. Schutte, G. J. Burghouts, "Automated Textual Descriptions for a Wide Range of Video Events with 48 Human Actions," European Conference on Computer Vision, International Workshop on Video Event Categorization, Tagging and Retrieval, 2012.

[6] N. Ikizler-Cinbis, S. Sclaroff, "Object, Scene and Actions: Combining Multiple Features for Human Action Recognition," European Conference on Computer Vision, 2010.

[7] S. Sadanand, J. J. Corso, "Action bank: A high-level representation of activity in video," International Conference on Computer Vision and Pattern Recognition, 2012.

[8] I. Laptev, M. Marszalek, C. Schmid, B. Rozenfeld, "Learning Realistic Human Actions from Movies," International Conference on Computer Vision and Pattern Recognition, 2008.

[9] H. Wang, M. M. Ullah, A. Klaser, I. Laptev, C. Schmid, "Evaluation of local spatio-temporal features for action recognition," British Machine Vision Conference, 2009.

[10] G. J. Burghouts, K. Schutte, "Correlations between 48 human actions improve their performance," British Machine Vision Conference, 2009.

[11] J. Sivic, A. Zisserman, "Video Google: A Text Retrieval Approach to Object Matching in Videos," International Conference on Computer Vision, 2003.

[12] I. Laptev, "On Space-Time Interest Points," International Journal of Computer Vision, 2005.

[13] G. J. Burghouts, K. Schutte, H. Bouma, R. J. M. den Hollander, "Selection of Negative Samples and Two-Stage Combination of Multiple Features for Action Detection in Thousands of Videos," Machine Vision and Applications, special issue on multimedia event detection, submitted, 2012.

[14] F. Moosmann, B. Triggs, F. Jurie, "Randomized Clustering Forests for Building Fast and Discriminative Visual Vocabularies," Neural Information Processing Systems, 2006.

[15] J. Zhang, M. Marszalek, S. Lazebnik, C. Schmid, "Local features and kernels for classification of texture and object categories: A comprehensive study," International Journal of Computer Vision, 2007.

[16] J. R. R. Uijlings, A. W. M. Smeulders, R. J. H. Scha, "The Visual Extent of an Object—Suppose We Know the Object Locations," International Conference on Computer Vision, 2012.

[17] L. Itti, C. Koch, E. Niebur, "A model of saliency-based visual attention for rapid scene analysis," IEEE Transactions on Pattern Analysis and Machine Intelligence, 1998.

[18] D. Gao and N. Vasconcelos, "Discriminant saliency for visual recognition form cluttered scenes," Neural Information Processing Systems, 2004.

[19] T. Harada, Y. Ushiku, Y. Yamashita, Y. Kuniyoshi, "Discriminative spatial pyramid," International Conference on Computer Vision and Pattern Recognition, 2011.

[20] B. Yao, A. Khosla, L. Fei-Fei, "Combining randomization and discrimination for fine-grained image categorization," International Conference on Computer Vision and Pattern Recognition, 2011.

[21] G. Sharma, F. Jurie, C. Schmid, "Discriminative Spatial Saliency for Image Classification," International Conference on Computer Vision and Pattern Recognition, 2012.

[22] J. Liu, J. Luo, M. Shah, "Recognizing Realistic Actions from Videos 'in the Wild'," International Conference on Computer Vision and Pattern Recognition, 2009.

[23] B. Chakraborty, M. Holte, T. B. Moeslund, J. Gonzalez, "Selective Spatio-Temporal Interest Points," Computer Vision and Image Understanding, 2012.

[24] www.visint.org, development kit of the recognition task, 2011.

[25] S. Maji, A. C. Berg, J. Malik, "Classification using intersection kernel support vector machines is efficient," International Conference on Computer Vision and Pattern Recognition, 2008.

[26] A. Vedaldi, A. Zisserman, "Efficient additive kernels via explicit feature maps," International Conference on Computer Vision and Pattern Recognition, 2010.

[27] A. Vedaldi, A. Zisserman, "Efficient additive kernels via explicit feature maps," International Conference on Computer Vision and Pattern Recognition, 2010.

[28] J. J. Koenderink, "The structure of images," Biological Cybernetics, 1984.

What is claimed is:
1. A method of automated support vector machine detection of presence of an action of a predetermined type of action from video data, the method comprising:
detecting spatiotemporal interest points (STIPs) in the video data;

extracting descriptors from the video data in spatiotemporal areas at the detected spatiotemporal interest points;

assigning the detected spatiotemporal interest points to bins in a feature vector based on the extracted descriptors;

computing bin values of the feature vector for each respective bin, the bin value of each bin comprising sum of contributions associated with descriptors that have been assigned to the bin, with a bin dependent adjustment of a size of the sum and/or the contributions of at least one of the bins dependent on the predetermined type of action;

computing a support vector machine (SVM) match score from the feature vector and reference vectors for the predetermined type of action;

using a parameter to control said adjustment of the size of the sum and/or the contributions, by making the size dependent on a value of the control parameter, the method comprising selecting the reference vectors and the value of the parameter, the method further comprising:

determining an initial set of reference vectors by means of an automatic training process using training bin values obtained without said adjustment;

computing bin scores for individual bins from scores for matches between bin values of bins of the set of reference vectors and counts of STIPs from a set of video segments that have been designated to show the predetermined type of action;

determining the value of the parameter based on the bin scores for the individual bins, the parameter being set to increase or decrease the bin value of the at least one of the bins relative to the bin values of other ones of the bins according to whether the bin score for the at least one of the bins is larger or smaller than the bin score for the other ones of the bins respectively; and determining the reference vectors for use in the support vector machine by means of an automatic training process using bin values obtained with said adjustment controlled by the parameter value.

2. The method according to claim 1, wherein the parameter is a weighting factor, the size of the sum and/or the contributions being adjusted by multiplying a count of the STIPs that have been assigned to the bin, and/or contributions to said count by from individual STIPs that have been assigned to the bin, by the weighting factor.

3. The method according to claim 1, wherein a weighting factor for the bin is selected dependent on a count value of STIPs in the bin based on a plurality of support vectors for the predetermined type of action, the weighting factor being increased with increasing count value when at least one of the support vectors for the predetermined type of action defines a component value for the bin that is higher than the count value of STIPs in the bin.

4. The method according to claim 1, wherein the bin score for each individual bin is computed as a sum of a bin dependent bias value and the score for the match between the bin value and the count of STIPs assigned to the bin, the method comprising:

determining an overall bias value for the predetermined type of action by means of said automatic training process using training bin values obtained without said adjustment; and assigning fractions of the overall bias value, for use as the bin dependent bias value, to respective ones of the bins, dependent on said counts for the respective one of bins.

5. The method according to claim 4, wherein the fractions of the overall bias value are assigned to respective ones of the bins in proportion to an average of said counts for the respective one of bins, the average being taken over said set of video segments, or the fractions of the overall bias value are assigned to respective ones of the bins in proportion to a value of said counts for the respective one of bins for one of said set of video segments.

6. The method according to claim 4, the method comprising:

computing values of the parameter for a plurality of different ways of assigning fractions of the bias value to respective ones of the bins, including said assignment dependent on said counts for the respective one of bins, comparing reliability of the detection of the presence of actions of the predetermined type obtained by detection using respective ones of the parameter values;

selecting one of the parameter values that yields a highest reliability; and using the reference vectors by means of an automatic training process using bin values obtained with said adjustment with said adjustment controlled by selected one of the parameter values.

7. The method according to claim 1, wherein the bin dependent adjustment comprises multiplying the sum and/or the contributions of at least one of the bins by a weighing factor that depends on the at least one of the bins and the predetermined type of action.

8. The method according to claim 1, wherein the SVM match score is computed by computing mutual scores, each mutual score between the feature vector and a respective one of the reference vectors for the predetermined type of action, and summing products of the mutual scores with factors for the respective ones of the reference vectors.

9. The method according to claim 8, comprising determining whether a result of said summing the products of the mutual scores with factors for the respective ones of the reference vectors exceeds a threshold value.

10. A method of automated detection of actions from a plurality of predetermined types of action, the method comprising executing the method of claim 1 for each of the plurality of predetermined types of action respectively, using, for each respective different predetermined type of action, a respective different bin dependent adjustment of a size of the sum and/or the contributions of at least one of the bins dependent on the predetermined type of action and respective different sets of reference vectors.

11. A non-transitory computer readable medium, comprising a program of instructions for a programmable computer system that, when executed by the programmable computer system, will cause the programmable computer system to execute the method according to claim 1.

12. A video action detection system for detecting presence of an action of a predetermined type of action from video data, the system comprising:

a source of video data or video data input;

a detector coupled to the source of video data or video data input, wherein the detector is configured to detect a spatiotemporal interest point (STIP);

an extractor coupled to the source of video data or video data input and the detector, wherein the extractor is configured to extract feature data from video data from the source of video data or video data input at STIPs detected by the detector;

a quantizer coupled to the extractor and configured to assign the extracted data to bins of a feature vector;

a computing circuit configured to compute bin values of the feature vector for each respective bin, the bin value of each bin comprising a sum of contributions associated with STIPs that have been assigned to the bin, with a bin dependent adjustment of a size of the sum and/or the contributions of at least one of the bins dependent on the predetermined type of action; and to compute a support vector machine (SVM) match score from the feature vector and reference vectors for the predetermined type of action; and a module, wherein the module is a training module, and wherein the module is configured to:

determine a set of reference vectors by means of an automatic training process using training bin values obtained without said adjustment;

compute bin scores for individual bins from scores for matches between bin values of bins of the further set of reference vectors and counts of spatiotemporal points of interest from a set of video segments that have been designated to show the predetermined type of action;

determine the value of the parameter based on the bin scores for the individual bins, the parameter being set to increase or decrease the bin value of the at least one of the bins relative to the bin values of other ones of the bins according to whether the bin score for the at least one of the bins is larger or smaller than the bin score for the other ones of the bins respectively; and determine the reference vectors by means of an automatic training process using bin values obtained with said adjustment controlled by the parameter value.

13. A video action detection system for detecting presence of an action from a plurality of predetermined types of action from video data, the system comprising a source of video data or video data input;

a detector coupled to the source of video data or video data input, wherein the detector is configured to detect a spatiotemporal interest point (STIP);

an extractor coupled to the source of video data or video data input and the detector, wherein the extractor is configured to extract feature data from video data from the source of video data or video data input at STIPs detected by the detector;

a quantizer coupled to the extractor and configured to assign the extracted data to bins of a feature vector;

a computing circuit configured to compute bin values of the feature vector for each respective bin, the bin value of each bin comprising a sum of contributions associated with STIPs that have been assigned to the bin, respective sets of bin values being computed for respective ones of the predetermined types of action, each with a bin dependent adjustment of a size of the sum and/or the contributions of at least one of the bins dependent on the predetermined type of action, using, for each respective different predetermined type of action, a respective different bin dependent adjustment of the size of the sum and/or the contributions of at least one of the bins dependent on the predetermined type of action and respective different sets of reference vectors; and to compute a support vector machine (SVM) match score from the feature vector and reference vectors for the predetermined type of action; and a module, wherein the module is a training module, and wherein the module is configured to:

determine a set of reference vectors by means of an automatic training process using training bin values obtained without said adjustment;

compute bin scores for individual bins from scores for matches between bin values of bins of the further set of reference vectors and counts of spatiotemporal points of interest from a set of video segments that have been designated to show the predetermined type of action;

determine the value of the parameter based on the bin scores for the individual bins, the parameter being set to increase or decrease the bin value of the at least one of the bins relative to the bin values of other ones of the bins according to whether the bin score for the at least one of the bins is larger or smaller than the bin score for the other ones of the bins respectively; and determine the reference vectors by means of an automatic training process using bin values obtained with said adjustment controlled by the parameter value.

14. A method of automated support vector machine detection of presence of an action from a plurality of predetermined types of action from video data, the method comprising the steps of detecting spatiotemporal interest points (STIPs) in the video data;

extracting descriptors from the video data in spatiotemporal areas at the detected spatiotemporal interest points;

assigning the detected spatiotemporal interest points to bins in a feature vector based on the extracted descriptors;

computing bin values of the feature vector for each respective bin, the bin value of each bin comprising sum of contributions associated with descriptors that have been assigned to the bin, respective sets of bin values being computed for respective ones of the predetermined types of action, each with a bin dependent adjustment of a size of the sum and/or the contributions of at least one of the bins dependent on the predetermined type of action, using, for each respective different predetermined type of action, a respective different bin dependent adjustment of the size of the sum and/or the contributions of at least one of the bins dependent on the predetermined type of action and respective different sets of reference vectors;

computing a support vector machine (SVM) match score from the feature vector and reference vectors for the predetermined type of action;

using a parameter to control said adjustment of the size of the sum and/or the contributions, by making the size dependent on a value of the control parameter, the method comprising selecting the reference vectors and the value of the parameter, the method further comprising:

determining an initial set of reference vectors by means of an automatic training process using training bin values obtained without said adjustment;

computing bin scores for individual bins from scores for matches between bin values of bins of the set of reference vectors and counts of STIPs from a set of video segments that have been designated to show the predetermined type of action;

determining the value of the parameter based on the bin scores for the individual bins, the parameter being set to increase or decrease the bin value of the at least one of the bins relative to the bin values of other ones of the bins according to whether the bin score for the at least one of the bins is larger or smaller than the bin score for the other ones of the bins respectively; and determining the reference vectors for use in the support vector machine by means of an automatic training process using bin values obtained with said adjustment controlled by the parameter value.

* * * * *